United States Patent [19]

Towle

[11] Patent Number: 4,820,792
[45] Date of Patent: Apr. 11, 1989

[54] PREPARATION OF AROMATIC POLYKETONES USING A STRONG ACID CATALYST WITH A WEAKER ACID SOLVENT

[75] Inventor: Ian D. H. Towle, Cirencester, England

[73] Assignee: Raychem Limited, London, England

[21] Appl. No.: 36,655

[22] Filed: Apr. 9, 1987

[30] Foreign Application Priority Data

Apr. 11, 1986 [GB] United Kingdom ............... 8608870

[51] Int. Cl.$^4$ ..................... C08G 67/00; C08G 75/23
[52] U.S. Cl. ................................... 528/126; 528/173; 528/207; 528/271
[58] Field of Search ............... 528/207, 126, 173, 271

[56] References Cited

U.S. PATENT DOCUMENTS

| | | | |
|---|---|---|---|
| 3,441,538 | 5/1969 | Marks | 528/206 |
| 3,666,612 | 5/1972 | Angelo | 528/194 |
| 3,953,400 | 4/1976 | Dahl | 528/206 |
| 4,361,693 | 11/1982 | Jansons | 528/86 |
| 4,396,755 | 8/1983 | Rose | 528/126 |
| 4,398,020 | 8/1983 | Rose | 528/126 |
| 4,415,720 | 11/1983 | Rose | 528/126 |
| 4,709,007 | 11/1987 | Jansons et al. | 528/222 |

FOREIGN PATENT DOCUMENTS

| | | |
|---|---|---|
| 49070 | 4/1982 | European Pat. Off. . |
| 63874 | 11/1982 | European Pat. Off. . |
| 75389 | 3/1983 | European Pat. Off. . |
| 87532 | 9/1983 | European Pat. Off. . |
| 128692 | 12/1984 | European Pat. Off. . |
| 994583 | 6/1965 | United Kingdom . |
| 1086021 | 10/1967 | United Kingdom . |
| 1122192 | 7/1968 | United Kingdom . |
| 209900 | 12/1982 | United Kingdom . |
| 2116990 | 10/1983 | United Kingdom . |

OTHER PUBLICATIONS

Makromol. Chem., Rapid Commun. 5, 833–836 (1985) Ueda et al.
Polym. Bull. 14, 367 (1985) Shaffer et al.

Primary Examiner—John Kight
Assistant Examiner—Frederick Krass
Attorney, Agent, or Firm—Yuan Chao; Edith A. Rice; Herbert G. Burkard

[57] ABSTRACT

Polyaryletherketones are synthesized by Friedel-Crafts chemistry using a catalytic quantity of a strong acid (e.g. trifluoromethanesulphonic acid) in a solvent of lower acidity preferably comprising a second acid of strength at least equal to chloroacetic acid. Suitable second acids can be recovered for reuse, and only a small (catalytic) amount of the expensive strong acid is required.

14 Claims, No Drawings

PREPARATION OF AROMATIC POLYKETONES USING A STRONG ACID CATALYST WITH A WEAKER ACID SOLVENT

This invention relates to the preparation of aromatic polyketones.

By aromatic polyketone is meant a polyketone, wherein the ketone group is bonded to an aromatic moiety in the polymer backbone, usually a phenylene moiety. Such polymers, and in particular polyketones wherein the ketone group is para-linked to an aromatic moiety, possess many commercially desirable properties, for example high temperature stability, mechanical strength, and solvent resistance.

One method for making aromatic polyketones is to react an aromatic diacyl halide, for example Cl—CO—Ar—CO—Cl, where Ar is an aromatic moiety, with an aromatic compound of the formula H—Ar'—H, where Ar' is an aromatic moiety, in a fluoroalkane sulphonic acid solvent which also acts as the polymerisation catalyst. Alternatively a self-polymerising aromatic monoacyl halide, for example H—Ar"—CO—Cl, where Ar" is an aromatic moiety, may be used in a fluoroalkane sulphonic acid solvent. Such a process is described in European Published Patent Application No. 63,874A.

A similar process is described in European Published Patent Application No. 87,532A, aromatic carboxylic acid groups being used in place of the aromatic acyl groups. In this reaction the reactants are dissolved in a fluoroalkane sulphonic acid solvent and a quinquevalent phosphorus halide, such as PCl₅, added.

In a paper entitled "Synthesis of polyketones by direct polycondensation of dicarboxylic acids with diaryl compounds using phosphorus pentoxide/methane sulphonic acid as condensing agent and solvent", M. Ueda and T. Kano, Makromol. Chem., Rapid Commun. 5, 833-836 (1985), the synthesis of polyketones is described whereby a di-carboxylic acid is reacted with a diaryl compound in a solvent comprising a 1:10 weight ratio of phosphorus pentoxide and methane sulphonic acid. The solvent also acts as a condensing agent.

The above processes all have the disadvantage that a large amount of expensive fluoroalkane sulphonic acid or methane sulphonic acid (hereinafter both included in the term "strong acid") is required as the acid is used in solvent quantities.

It has now been discovered that aromatic polyketones can be prepared using only a catalytic amount of a strong acid in a solvent system which is not mentioned in the known references to polyketone synthesis cited above.

Accordingly the present invention provides a method for the preparation of an aromatic polyketone which comprises reacting under anhydrous conditions either:
(I) a compound of the formula:

X—CO—B—Ar—H which is self-polymerising and reacts to produce a polymer containing the repeat unit

or
(II) a mixture of:
(i) a compound of the formula:

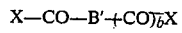

and
(ii) a compound of the formula:

H—Ar—B"—Ar—H the compounds reacting to produce a polymer containing the repeat unit 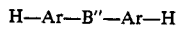 or
(III) a combination of (I) and (II),
where
each Ar is independently an aryl moiety;
B and B' are each independently an aromatic, aliphatic, aromatic/aliphatic, heterocyclic alicylic or alkylhalide moiety and B is linked to Ar by —O—, —S—, or a direct bond;
B" is an aromatic, aliphatic, aromatic/aliphatic, heterocyclic, alicyclic or alkylhalide moiety, an oxygen or sulphur atom or a chemical bond;
X is a halogen atom, an —OH group, or the group —O⁻M⁺ where M is an alkali metal;
O is an oxygen atom;
H is a hydrogen atom activated towards electrophilic substition and bonded to an aromatic carbon atom of Ar; and
b is zero or 1,
the reaction being carried out in the presence of a substantially only catalytic amount of a strong acid having an acid strength at least as great as that of methane sulphonic acid, and in a solvent system that has an acid strength less than that of the chosen strong acid,
with the proviso that when X is an —OH group the reaction mixture contains a dehydrating agent, which may constitute the solvent system or a component thereof, or may be an additional compound, to remove water produced during the reaction.

Because a catalytic rather than a solvent amount of the strong acid is used, the present invention provides a less expensive route to polyketones. By "catalytic amount" is preferably meant an amount such that the molar ratio of strong acid to the group X—CO— present in the reaction mixture is less than 1 mole of strong acid to 1 mole of the group X—CO—, one such group being present in the single self-polymerisation of the compound of (I), and two such groups in the compounds of (II)(i). Preferably less than 0.5 mole of strong acid to 1 mole of the group X—CO— is used, more preferably less than 0.2 mole of strong acid, and especially less than 0.1 mole of strong acid to 1 mole of the group X—CO— is used.

Preferably the strong acid has an acid strength greater than that of methane sulphonic acid. Preferred strong acids are fluoroalkane sulphonic acids, for example trifluoromethane sulphonic acid.

By "acid strength", referred to above and hereinafter, is meant the strength of an acid according to its Hammett $H_o$ value, which may be obtained from the literature or be readily determined by experiment.

Preferably the reaction is carried out in the presence of a second acid that constitutes or is a component of the solvent system and has an acid strength at least as great as that of chloroacetic acid, preferably at least as great as that of dichloroacetic acid, but preferably less than that of methane sulphonic acid. Trifluoroacetic or trichloroacetic acid or a mixture thereof are especially preferred.

The amount of second acid present in the reaction mixture may be solvent quantities, but preferably, the bulk of the solvent system comprises one or more other components in addition to the second acid, in which case the amount of second acid in the reaction mixture is preferably such that the molar ratio of second acid to the group X—CO— is 0.5 to 5 moles, preferably 1 to 3 moles, of second acid to 1 mole of the group X—CO—. It appears that the use of the second acid in the reaction encourages substantially only the hydrogen atom bonded in the para position of the or each aromatic ring that forms the end group or groups in the compound of (I) or (II)(i) respectively to react with the atom or group X, thus producing aromatic polyketones wherein the ketone group is para-linked to an aromatic ring. Without putting any limitation on the scope of the invention, it is thought that this occurs because the second acid de-activates the said aromatic ring or rings, thus inhibiting a reaction at the ortho positions.

Alternatively the solvent system, which may be acid or non-acidic, may constitute or contain as a component thereof, one or more other solvents such as a phosphoric acid, for example polyphosphoric acid, or a chlorinated organic solvent, for example chloroform, methylene chloride, 1,2 dichloroethane, trichloroethane or dichlorobenzene. Preferably, however, the solvent system comprises the second acid and another component or components, which or one of which is preferably a phosphoric acid or a chlorinated organic solvent. Preferably the solvent system also comprises phosphorus pentoxide, generally in an amount from 1 to 15 weight percent based on the total weight of the solvent system. When polyphosphoric acid is used as the or a component of the solvent system, it may optionally be formed in situ by the reaction of phosphoric acid with phosphorus pentoxide.

Preferably X is either a chlorine atom, the compounds of (I) and (II)(i) thus being acid chlorides, or an —OH group, the compounds of (I) and (II)(i) thus being carboxylic acids.

When the compound of (I) or (II)(i) is a carboxylic acid, the reaction mixture must contain a dehydrating agent to remove the water produced during the reaction. One suitable dehydrating agent is phosphorus pentoxide, which may constitute a component of the solvent system or may be an additional component in the reaction mixture. The solvent, for example polyphosphoric acid, may also act as a dehydrating agent.

Preferably the aromatic moiety Ar is a phenylene moiety, and more preferably a para-linked phenylene moiety.

One of a variety of moieties may be chosen for each of B, B' and B" (plus an oxygen or sulphur atom or a chemical bond for B"). By aromatic, aliphatic, aromatic/aliphatic, heterocyclic, alicylic or alkyl halide moiety is meant a moiety containing one or more aromatic, aliphatic, aromatic/aliphatic, heterocyclic, alicyclic or alkylhalide groups respectively. One preferred moiety is a wholly aromatic moiety by which is meant that the backbone chain of the moiety contains at least one aromatic group and no two adjacent aliphatic carbon atoms. Examples of suitable moieties are given below in the examples of suitable compounds of (I), (II)(i) and (II)(ii). In these examples Ph represents a phenyl group and —Ph— a para-linked phenylene moiety.

Examples of suitable compounds for (I) include the following:

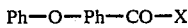

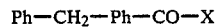

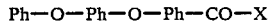

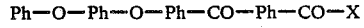

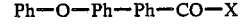

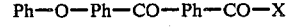

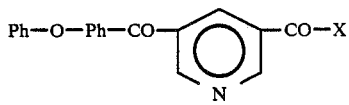

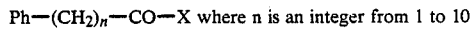

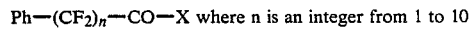

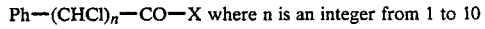

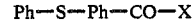

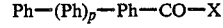

where p is zero or an integer from 1 to 4

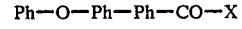

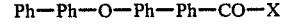

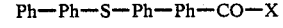

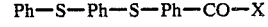

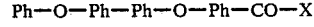

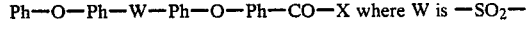

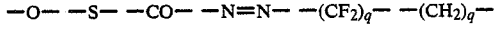

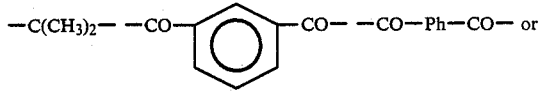

—O(CF$_2$)$_q$O— where q is an integer from 1 to 20.

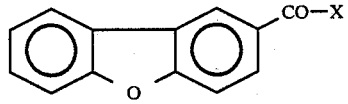

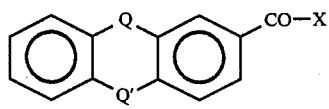

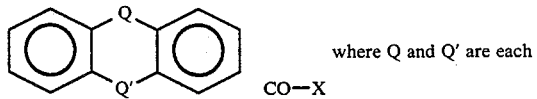

where Q and Q' are each independently —CH$_2$—, —O—, —S— or a chemical bond.

Examples of suitable compounds for the compound of (II)(i) include the following:

-continued

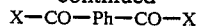
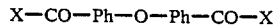
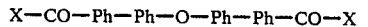

X—CO—Ph—O$\dashv$Ph—O$\dashv_p$Ph—CO—X where p is an integer from 1 to 4

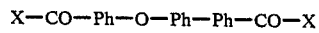

X—CO—Ph$\dashv$Ph—O$\dashv_p$CO—X where p is an integer from 1 to 4

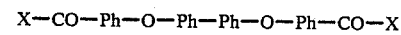
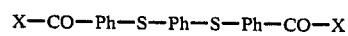

X—CO—Ph—O—Ph—W—Ph—O—Ph—CO—X where W is

—SO$_2$— —O— —S— —CO— —N=N—

—(CF$_2$)$_q$— —(CH$_2$)$_q$— —C(CH$_3$)$_2$—

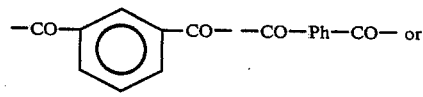

—O(CF$_2$)$_q$O— where q is an integer from 1 to 20

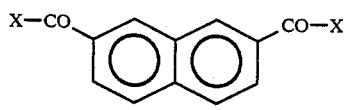

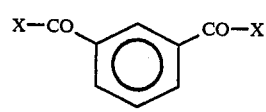

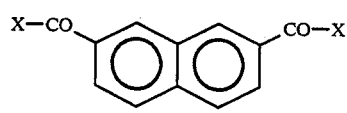

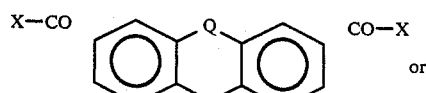

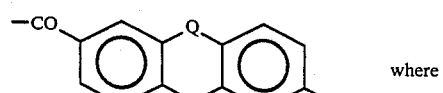 where

Q and Q' are each independently —CH$_2$—, —O—,

—S— or a chemical bond.

Examples of suitable compounds for the compound of (II)(ii) include the following:

Ph—O—Ph

Ph—(CH$_2$)$_n$—Ph where n is an integer from 1 to 10

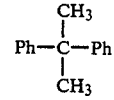

Ph—(CF$_2$)$_n$—Ph where n is an integer from 1 to 10

Ph—O$\dashv$Ph—O$\dashv_p$Ph where p is an integer from 1 to 4

Ph—Ph—O—Ph

Ph—OCH$_2$CH$_2$O—Ph

Ph—O—Ph—CO—Ph—O—Ph

Ph—O—P—SO$_2$—Ph—O—Ph

Ph—O—Ph—Ph—O—Ph

Ph—S—Ph

Ph—S$\dashv$Ph—S$\dashv_p$Ph where p is an integer from 1 to 4

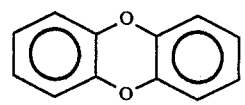

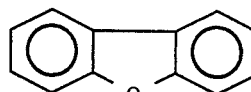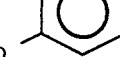 where Q is —O—, —S—, or —CH$_2$—

When the reaction comprises the self-polymerisation of the compound of (I), the reaction may comprise the polymerisation of one type of compound of the formula defined in (I), or may comprise the polymerisation of two or more different compounds, each having the formula defined in (I). Likewise when the reaction comprises reaction of a compound of (II)(i), with a compound of (II)(ii), one or more different types of compound of (II)(i) and one or more different types of compound (II)(ii), may be employed in the reaction. When the reaction comprises a combination of (I) and (II), then one of more different types of each of compounds (I), (II)(i) and (II)(ii) may be employed in the reaction.

The method according to the present invention is advantageously carried out in anhydrous conditions. Other reaction conditions, such as temperature and pressure, depend upon the components employed in the reaction and can readily be determined by experiment. Generally the temperature is between room temperature and 200° C., more usually 70° to 100°; and the reaction may usually be carried out at atmospheric pressure.

Preferably the reaction components are added to the reaction mixture in the following order: solvent, phosphorus pentoxide, dehydrating agent (if used and if different from phosphorus pentoxide), second acid, compound of (I), or (II)(i) and (ii), or mixture thereof, and strong acid, although it is to be understood that the components may be added in any order provided the chosen order does not adversely affect the reaction.

Where a suitable second acid is chosen, for example trichloroacetic or trifluoroacetic acid, the second acid may be recovered after the reaction, for example by vacuum distillation.

If desired the strong acid may also be recovered, for example by vacuum distillation.

The invention will now be illustrated by the following Examples:

EXAMPLE 1

To 200 g of polyphosphoric acid was added 40 g of phosphorous pentoxide and 25 g of p-phenoxybenzoyl chloride. The mixture was stirred at 80° C. for about 30 minutes until homogeneous. To the mixture was slowly added 25 mls of methane sulphonic acid followed by 2.5 mls of trifluoromethane sulphonic acid. During the addition the mixture developed an orange/red colour. The mixture was stirred at 90° C. for 2½ days. After this time the syrup was poured, whilst still hot, into cold water where it solidified. The solid was broken up in water using a Warring blender resulting in a pink fibrous solid. This solid was then digested in a 10% solution of NaOH resulting in a polymeric solid.

After filtration and drying the polymer had an I.V. of 0.95 dl/g. The structure of the repeat unit of the resulting polymer, confirmed by $^{13}C$ n.m.r. spectroscopy and infra-red spectrophotometry, was $+Ph-O-Ph-CO+$.

EXAMPLE 2

The same procedure was used as described in Example 1, except that the methane sulphonic acid was replaced by trifluoroacetic acid.

After working up as described in Example 1 the polymer had an I.V. of 1.03 dl/g.

EXAMPLE 3

To 200 g of polyphosphoric acid was added 20 g of phosphorous pentoxide and 15 g of p-phenoxybenzoic acid. The mixture was then heated to 60° C. and stirred for 30 minutes. After this time 20 mls of trifluoroacetic acid was added followed after about 15 minutes by 5 g of trifluoromethane sulphonic acid. After stirring at 80° C. for 2 days the mass was highly viscous and bright red in colour.

The polymer was worked up by the method described in Example 1. After drying the polymer had an I.V. of 2.06 dl/g. The structure of the repeat unit of resulting polymer, confirmed by $^{13}C$ n.m.r. spectroscopy and infra-red spectrophotometry, was $+Ph-O-Ph-CO+$.

EXAMPLE 4

To 100 mls of 1,2-dichloroethane was added 20 g of p-phenoxybenzoyl chloride followed by the slow addition of 11 g of trifluoromethane sulphonic acid. After stirring at room temperature for 24 hours 5 g of phosphorous pentoxide was added and the mixture heated to 60° C. After a further 36 hours the mixture had become viscous.

The mixture was worked up as described in Example 1 giving a polymer having an I.V. of 0.55 dl/g.

EXAMPLE 5

To 200 g of polyphosphoric acid was added 20 g of phosphorous pentoxide, 20 g of trichloroacetic acid and 25 g of p-phenoxybenzoyl chloride. The mixture was stirred at 70° C. until fully blended. To the mixture was slowly added 5 g of trifluoromethane sulphonic acid and the whole stirred at 85° C. over 2 days. After the first day the mixture was deep red and the viscosity had increased considerably.

The mixture was worked up as described in Example 1 resulting in a polymer having an I.V. of 0.45 dl/g.

EXAMPLE 6

To 50 g of trichloroacetic acid and 10 mls of trifluoroacetic acid was added 5 g of phosphorous pentoxide and the resulting mixture stirred at 80° C. for 2 hours. To this was added 5 g of p-phenoxybenzoyl chloride followed by 2 g of trifluoromethane sulphonic acid. The mixture was stirred in an oil bath at 100° C. for 2½ days resulting in a red viscous mass.

After working up as described in Example 1, the resulting polymer had an I.V. of 0.52 dl/g.

I claim:

1. A method for the preparation of an aromatic polyketone which comprises reacting under anhydrous conditions either:

(I) a compound of the formula

X—CO—B—Ar—H which is self-polymerizing and reacts to produce a polymer containing the repeat unit

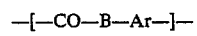

—[—CO—B—Ar—]— or (II) a mixture of:
(i) a compound of the formula:

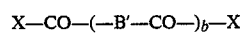

X—CO—(—B'—CO—)$_b$—X and (ii) a compound of the formula:

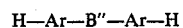

H—Ar—B"—Ar—H the compounds reacting to produce a polymer containing the repeat unit

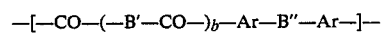

—[—CO—(—B'—CO—)$_b$—Ar—B"—Ar—]— or (iii) a combination of (I) and (II), where each Ar is independently an aryl moiety;

B and B' are each independently an aromatic, aliphatic, aromatic/aliphatic, heterocyclic, alicyclic, or alkylhalide moiety and B is linked to Ar by —O—, —S—, or a direct bond;

B" is an aromatic, aliphatic, aromatic/aliphatic, heterocyclic, alicyclic or alkylhalide moiety, an oxygen or sulphur atom or a chemical bond;

X is a halogen atom, an —OH group, or the group —O$^-$M$^+$ where M is an alkali metal;

O is an oxygen atom;

H is a hydrogen activated towards electrophilic substitution and bonded to an aromatic carbon atom of Ar; and b is zero or 1, the reaction being carried out in the presence of a substantially only catalytic amount of a strong acid having an acid strength at least as great as that of methane sulphonic acid, and in a solvent system that (a) has an acid strength less than that of the chosen strong acid, and (b) comprises a second acid other than phosphoric acid having an acid strength at least as great as that of chloroacetic acid, with the proviso that when X is an —OH group the reaction mixture contains a dehydrating agent, which may constitute the solvent system or a component thereof, or may be an additional compound, to remove water produced during the reaction.

2. A method according to claim 1 wherein the strong acid has an acid strength greater than that of methane sulphonic acid.

3. A method according to claim 2 wherein the strong acid is a fluoroalkane sulphonic acid.

4. A method according to claim 3 wherein the strong acid is trifluoromethane sulphonic acid.

5. A method according to claim 1 wherein the molar ratio of strong acid to the group X—CO— present in the reaction is less than 1 mole of strong acid to 1 mole of the group X—CO—.

6. A method according to claim 1 wherein the solvent system has an acid strength less than that of methane sulphonic acid.

7. A method according to claim 1 wherein the reaction is carried out in the presence of a phosphoric acid that constitutes or is a component of the solvent system.

8. A method according to claim 1 wherein the reaction is carried out in the presence of a chlorinated organic solvent that constitutes or is a component of the solvent system.

9. A method according to claim 1 wherein the second acid is recovered after the reaction.

10. A method according to claim 1 wherein phosphorus pentoxide is included in the reaction mixture.

11. A method according to claim 1 wherein the group X—CO— is bonded to an aromatic carbon atom of B or B'.

12. A method according to claim 1 wherein Ar is a phenylene moiety.

13. A method according to claim 1 wherein X is a chlorine atom.

14. A method according to claim 1, wherein X is an —OH group.

* * * * *

UNITED STATES PATENT AND TRADEMARK OFFICE
CERTIFICATE OF CORRECTION

PATENT NO. : 4,820,792
DATED : April 11, 1989
INVENTOR(S) : Towle

Page 1 of 2

It is certified that error appears in the above-indentified patent and that said Letters Patent is hereby corrected as shown below:

Cover Page, References Cited [56], Foreign Patent Documents, line 9, replace "209900" by --2099006--.

Column 2, line 1, replace the formula "X-CO-B'-(CO)$_b$-X" by -- X-CO-(-B'-CO-)$_b$-X --.

Column 2, lines 9 to 10, replace the formula "-(CO-B-'-CO-Ar-B"-Ar)-" by -- -(CO-B'-CO-Ar-B"-Ar)- --.

Column 4, line 30, delete "Ph-O-Ph-Ph-CO-X".

Column 4, line 55, after the formula " 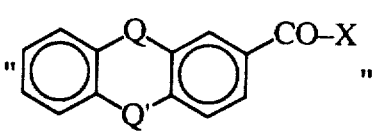 " insert --or--.

UNITED STATES PATENT AND TRADEMARK OFFICE
CERTIFICATE OF CORRECTION

PATENT NO. : 4,820,792
DATED : April 11, 1989
INVENTOR(S) : Towle

It is certified that error appears in the above-indentified patent and that said Letters Patent is hereby corrected as shown below:

Column 5, line 15, replace the formula "X-CO-Ph-{Ph-O}$_p$-CO-X" by -- X-CO-Ph-{Ph}$_p$-CO-X --.

Column 5, line 60, replace the formula

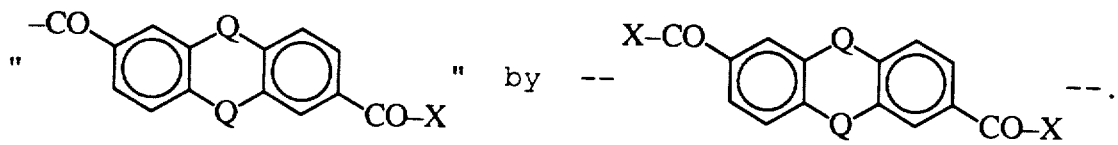

Column 7, line 30, replace the formula "'Ph-O-Ph-CO}-" by -- -{Ph-O-Ph-CO}- --.

Claim 1, line 33, after "hydrogen" insert --atom--.

Signed and Sealed this

Fifteenth Day of March, 1994

BRUCE LEHMAN

Attesting Officer    Commissioner of Patents and Trademarks